United States Patent [19]
Brooks, II et al.

[11] Patent Number: 5,921,607
[45] Date of Patent: Jul. 13, 1999

[54] VEHICLE SUN VISOR EXTENSION

[76] Inventors: Leon Brooks, II; Gail Brooks, both of P.O. Box 692, Grand Lake, Colo. 80447

[21] Appl. No.: 09/239,127

[22] Filed: Jan. 28, 1999

Related U.S. Application Data

[63] Continuation-in-part of application No. 29/074,695, Jul. 31, 1997.

[51] Int. Cl.⁶ ........................................................ B60J 3/02
[52] U.S. Cl. .......................................... 296/97.6; 296/97.8
[58] Field of Search ..................................... 296/97.8, 97.6

[56]             References Cited

U.S. PATENT DOCUMENTS

| | | | |
|---|---|---|---|
| 3,336,072 | 8/1967 | Leonard | 296/97.8 |
| 3,948,554 | 4/1976 | Barbee | 296/97.6 |
| 4,736,979 | 4/1988 | Harvey | 296/97.6 |
| 4,913,483 | 4/1990 | Jasso | 296/97.6 |
| 5,042,867 | 8/1991 | Crotty, III et al. | 296/97.8 |
| 5,259,657 | 11/1993 | Arendt et al. | 296/97.6 |

FOREIGN PATENT DOCUMENTS

| | | | |
|---|---|---|---|
| 1545330 | 11/1968 | France | 296/97.6 |
| 2148266 | 4/1973 | Germany | 296/97.6 |
| 1504700 | 3/1978 | United Kingdom | 296/97.6 |

*Primary Examiner*—Joseph D. Pape
*Attorney, Agent, or Firm*—John B. Phillips; Gregg I. Anderson

[57]             ABSTRACT

A sun visor extension includes a base and an extension member connected to move relative to the base. Once the base is attached to a surface of an existing vehicle sun visor, a user selectively slides the extension member between a stowed position either in front of or behind the sun visor and a deployed position extending laterally from the sun visor. One embodiment of the base includes a channel for receiving an edge of the extension member, and the extension member includes opposing ends having stop members to prevent the extension member from being separated from the base. The position of the base relative to the sun visor is adjustable to allow the position of the fully deployed extension member to be adjusted.

10 Claims, 6 Drawing Sheets

VEHICLE SUN VISOR EXTENSION

This application is a continuation-in-part application of U.S. design patent application Ser. No. 29/074,695 filed Jul. 31, 1997.

FIELD OF THE INVENTION

This invention relates generally to vehicle sun visors. More particularly, the present invention relates to a new and improved lateral sun visor extension adapted for releasable attachment to existing vehicle sun visors.

BACKGROUND OF THE INVENTION

Vehicle sun visors are typically attached to the roof of the vehicle adjacent the top of the windshield. Each sun visor is normally mounted to pivot about two different axes. The first (horizontal) axis allows rotation of the sun visor between a first position adjacent the roof of the vehicle and a second position extending downward from the vehicle roof to shield the front seat occupant from sun glare. The second (vertical) axis allows rotation of the sun visor between a first position adjacent the vehicle windshield and a second position adjacent a side window of the vehicle.

Most vehicles provide a pair of opposing sun visors for use by front seat occupants of the vehicle. The opposing sun visors are usually separated from one another by a lateral space sufficient to allow insertion of a rear view mirror between the two visors. However, the sun visors in most modern vehicles do not typically extend to the rear view mirror and thus leave a gap that allows light rays to pass unobstructed to the front seat occupant. Additionally, most sun visors are shorter than the width of a side passenger window and therefore leave a gap in the coverage provided when the sun visor is pivoted from the front windshield to the side window.

While numerous attempts have been made to address the shortcomings of conventional vehicle sun visors, these attempted solutions usually fall short of the mark in the areas of cost, complexity or ease of use. For example, high-end automobiles may include sun visors incorporating complex systems for changing the size or shape of the visor to accommodate different users and changing driving conditions. However, such systems are not easily retrofitted to existing sun visors and may be prohibitively expensive for the average user. Other devices designed to be attached to existing sun visors rely on complex mechanisms for both attaching the device to the visor and for extending the coverage provided by the visor. Furthermore, most add on sun visor extensions focus on the limited vertical dimension of the visor once the visor is rotated downward from the roof of the vehicle rather than the lateral size of the visor. Such extension systems thus tend to hang from the sun visor to expand the vertical coverage provided by the visor, and are particularly useful only for shorter front seat occupants.

Thus, a simple and inexpensive lateral extension system is needed to address the shortcomings of traditional sun visors.

It is with respect to these and other background considerations, limitations and problems, that the present invention has evolved.

SUMMARY OF THE INVENTION

One of the significant aspects of the present invention pertains to a sun visor extension for extending the lateral coverage provided by a conventional vehicle sun visor.

Another significant aspect of the present invention relates to a sun visor extension which is simple to install and easy to operate.

A further aspect of the present invention pertains to a sun visor extension which may be easily attached to and removed from a vehicle's existing sun visor and which may be easily adjusted to provide a desired degree of extension relative to the existing sun visor.

Another aspect of the present invention relates to a sun visor extension which remains firmly secured to the existing sun visor, even when the extension is moved between a stowed position and a deployed position.

In a preferred embodiment, the sun visor extension includes a stationary base secured to either a front or rear surface of the existing sun visor and an extension member attached to the base in a manner which allows sliding movement of the extension member relative to the base.

A preferred embodiment of the base includes an attachment device to allow the base to be releasably attached to and adjustably positioned on the existing sun visor, thereby permitting adjustment of the fully deployed position of the extension member.

A preferred embodiment of the extension member includes at least one edge which slides within a channel defined by the base. The extension member further includes two opposing ends shaped to prevent their entry into the channel, thereby preventing the extension member from being inadvertently separated from the base.

A more complete appreciation of the present invention and its scope may be obtained from the accompanying drawings, which are briefly summarized below, from the following detailed description of a presently preferred embodiment of the invention, and from the appended claims.

DETAILED DESCRIPTION OF THE DRAWINGS

DETAILED DESCRIPTION OF THE PREFERRED EMBODIMENT

Figure 1:
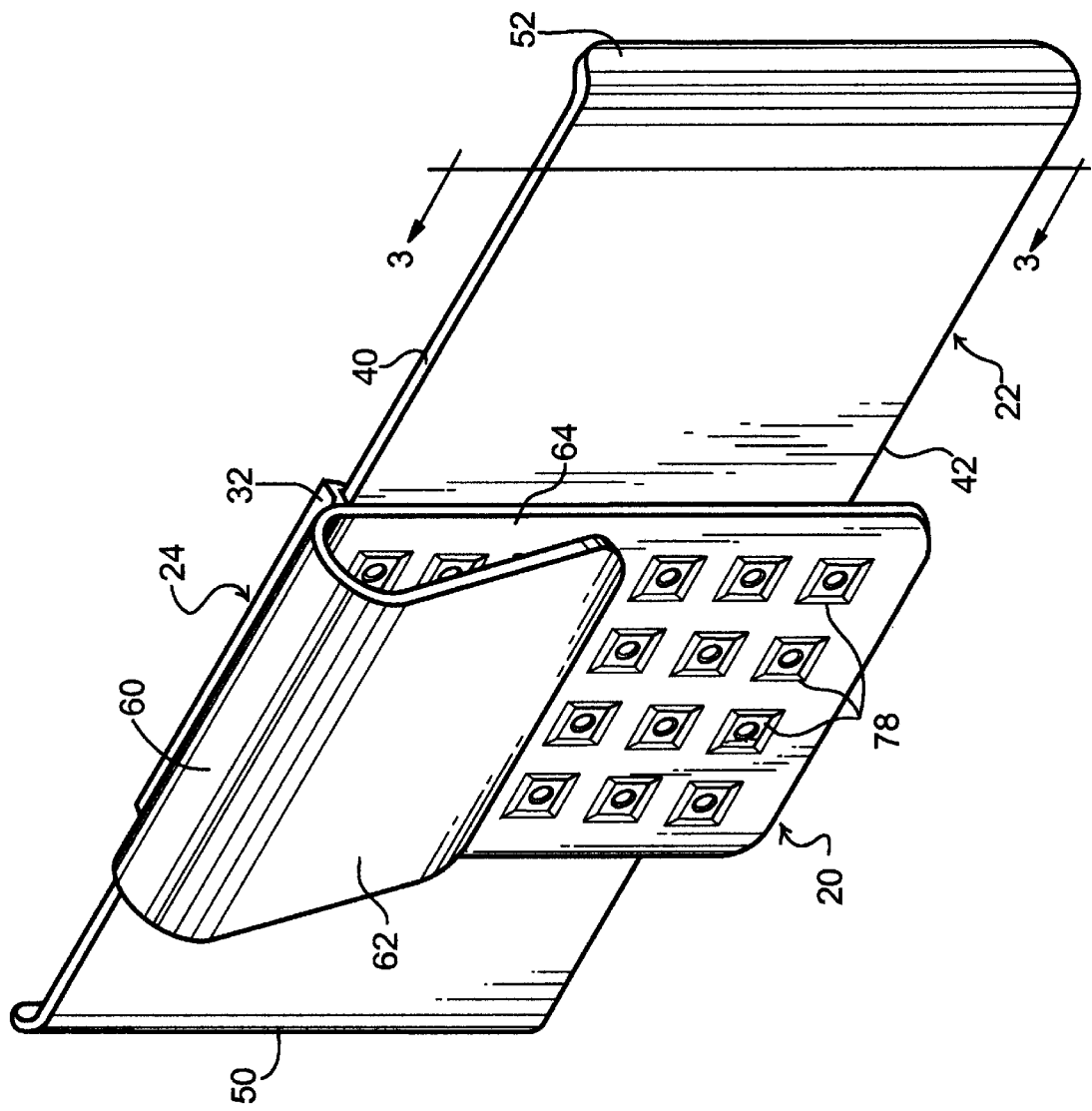
FIG. 1 is an isometric view of an improved sun visor extension according to the present invention.
Figure 2:
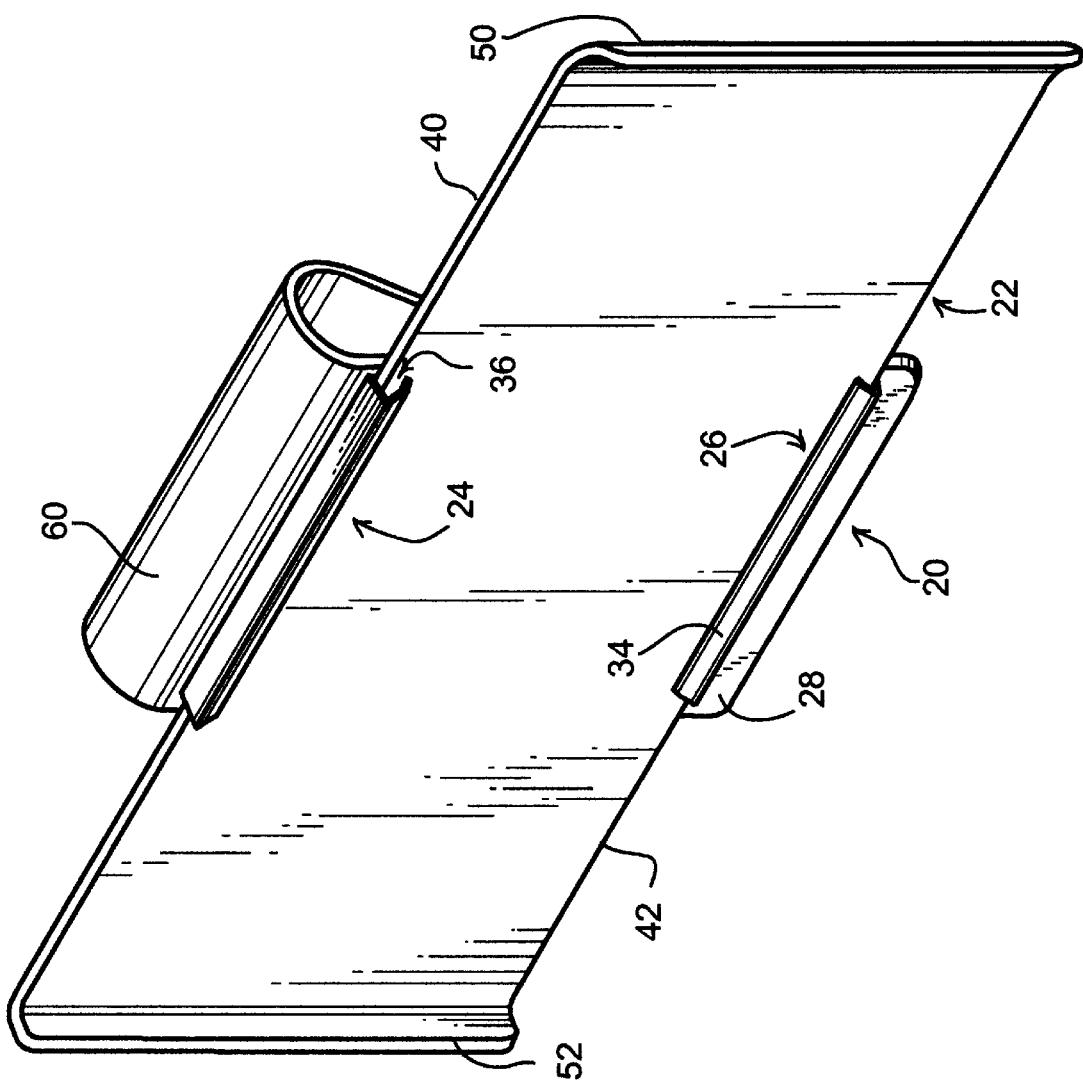
FIG. 2 is an isometric view of the sun visor extension of FIG. 1 showing an opposite side of the sun visor extension.

FIGS. 1 and 2 illustrate a preferred embodiment of the sun visor extension of the present invention comprising a base 20 and an extension member 22 which slides laterally back and forth in relation to the base 20. The base 20 is adapted for attachment to a vehicle sun visor as described below.

Upper and lower tracks 24 and 26 fixed to a rear surface 28 of the base 20 act to both retain the extension member 22 and allow sliding movement of the member 22 relative to the base 20. Each track 24, 26 preferably comprises an inner wall 30 attached to the rear surface 28 of the base 20, a top or bottom wall 32 extending outwardly from the inner wall 30, and an outer wall 34 extending from the wall 32 substantially parallel to the inner wall 30. The walls 30, 32 and 34 of each track 24, 26 cooperate to form channels 36 and 38 for receiving top and bottom edges 40 and 42, respectively, of the extension member 22. The channels 36 and 38 are separated from the rear surface 28 of the base 20 by the thickness of the inner wall 30, thereby preventing any contact (and thus friction) between the sliding extension member 22 and the rear surface 28 of the base 20. Additionally, the outer wall 34 is preferably angled slightly toward the inner wall 30 (FIG. 3) to provide a snug fit with the extension member 22 and to prevent the member 22 from vibrating within the channels 36, 38.

While the tracks 24 and 26 represent a simple and inexpensive means for attaching the extension member 22 to the base 20, the present invention is intended to cover a variety of different attachment means. For example, a single channel in the nature of a tongue and groove connection (not shown) may be used in place of the tracks 24 and 26 to allow a sliding engagement between the extension member 22 and the base 20.

The extension member 22 is preferably rectangular in shape with rounded ends 50 and 52. The rounded ends 50, 52 provide two distinct benefits. First, each rounded end 50, 52 provides a handle allowing a user to conveniently grasp one end of the extension member 22 when sliding the member 22 relative to the base 20. Second, the rounded ends 50, 52 act as end stops to prevent the member 22 from being accidentally withdrawn from the tracks 24 and 26. For example, as the rounded end 50 approaches the tracks 24 and 26 in FIG. 2, the curved surface of the end 50 frictionally engages the outer wall 34 of each of the tracks 24 and 26, thereby preventing the rounded end 50 from entering the channels 36, 38.

Figure 3:
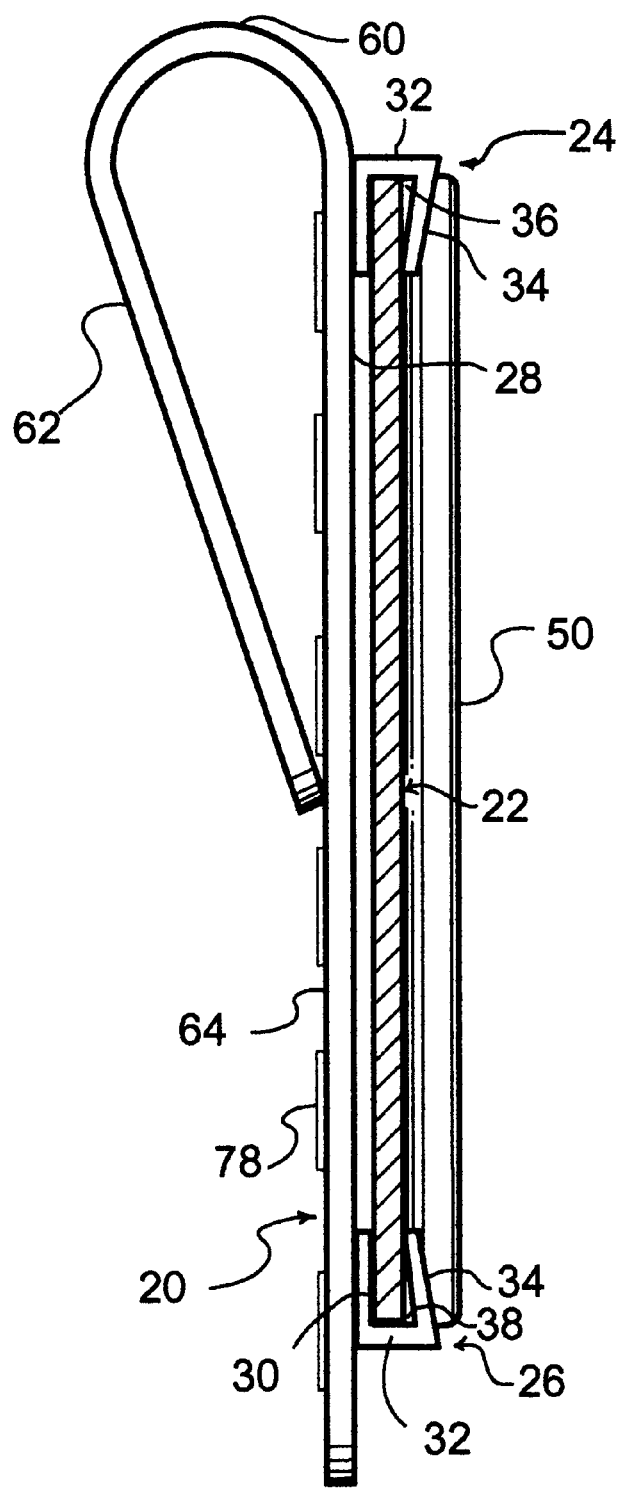
FIG. 3 is a section view taken substantially along the line 3—3 in FIG. 1.
Figure 4:
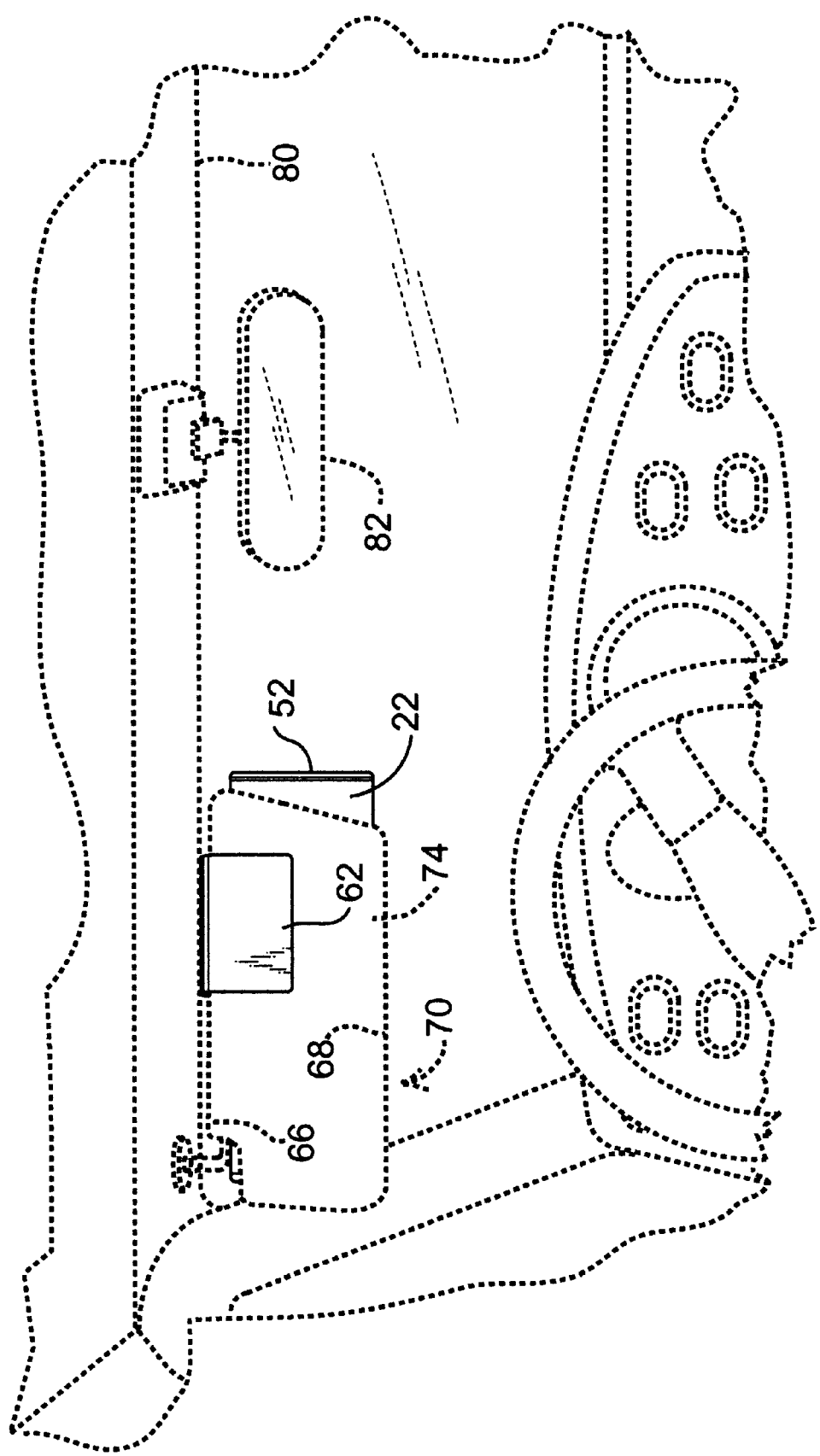
FIG. 4 is an isometric view of the sun visor extension shown in FIG. 1, illustrating the sun visor extension in a stowed position attached to a conventional vehicle sun visor, where phantom lines are used to designate the conventional sun visor and the associated vehicle.
Figure 5:
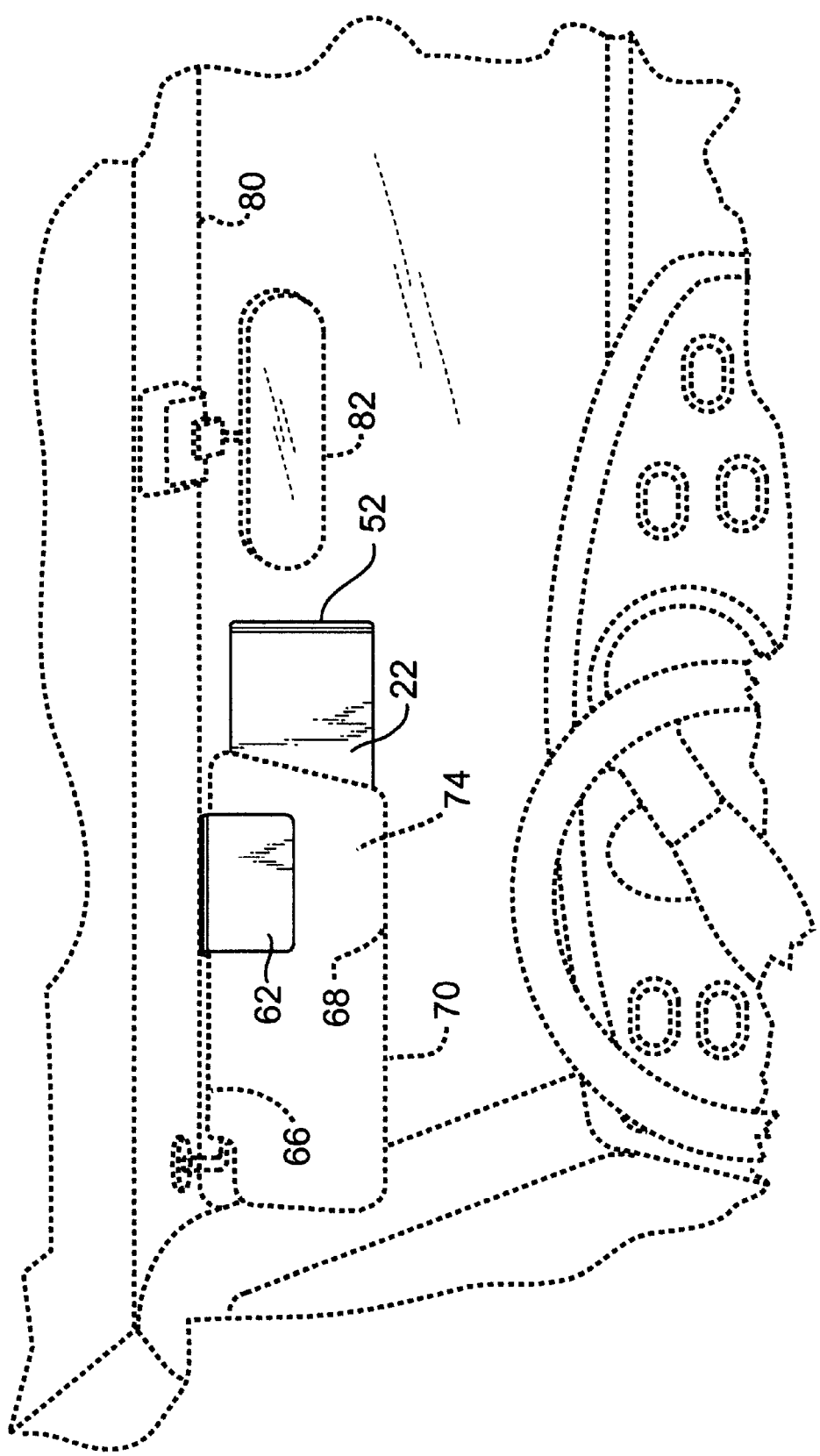
FIG. 5 is an isometric view similar to FIG. 4 illustrating the sun visor extension in a deployed position.
Figure 6:
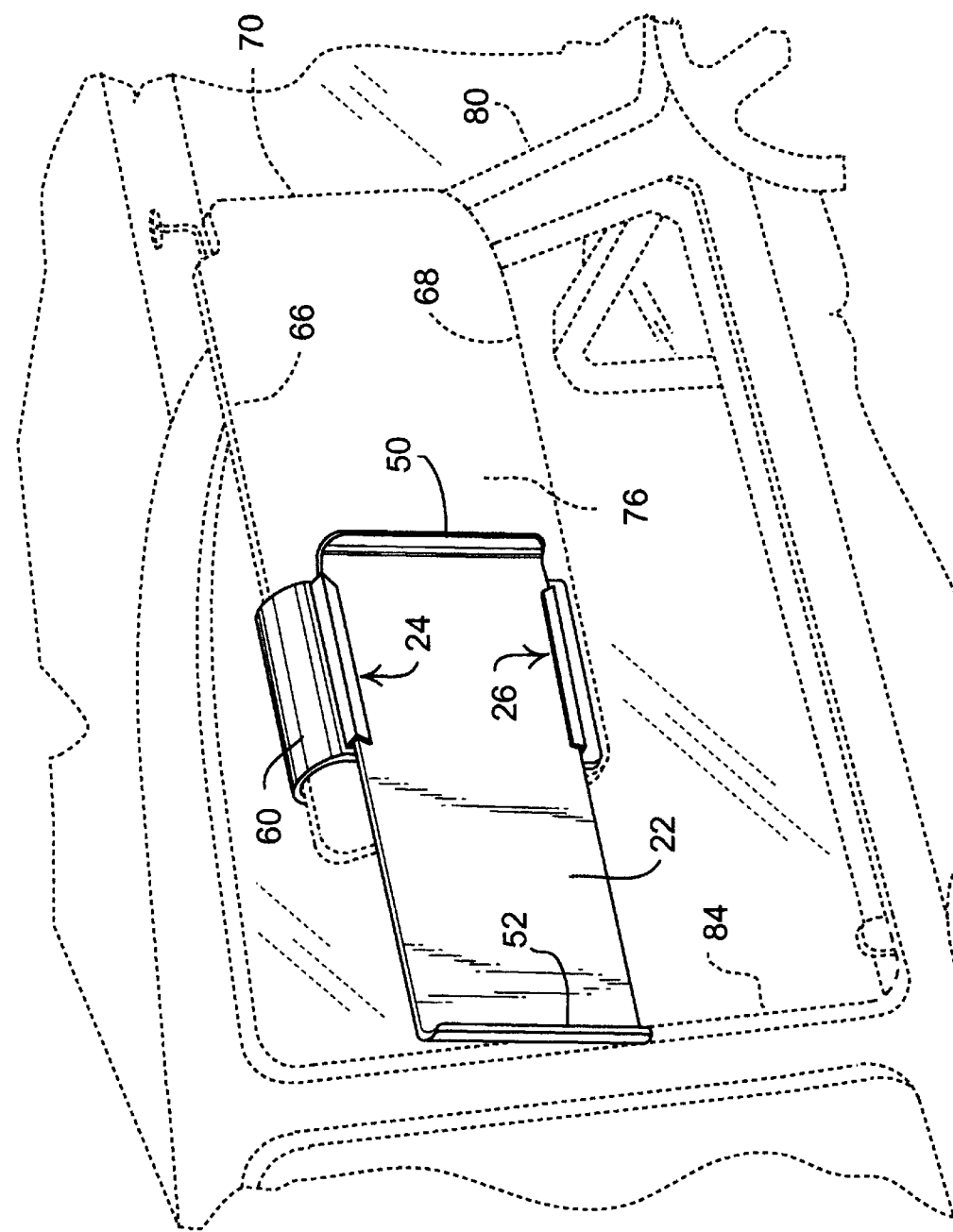
FIG. 6 is an isometric view of the sun visor extension shown in FIG. 1, illustrating the conventional vehicle sun visor pivoted to cover a side window of the vehicle, and further illustrating the sun visor extension in a deployed position.

The base 20 is preferably rectangular in shape with a rounded clip portion 60 extending from the top of the base 20. A depending end 62 of the clip portion 60 preferably extends approximately half way down the length of the base 20 and is biased toward a front surface 64 of the base 20, as shown in FIGS. 1–3. The clip portion 60 is adapted to fit over either a top edge 66 or a bottom edge 68 of a conventional vehicle sun visor 70. FIGS. 4–6 illustrate the clip portion 60 fitted over the top edge 66 of the sun visor 70, where the sun visor 70 and surrounding vehicle environment are shown with phantom lines.

When placed over the top edge 66 of the sun visor 70 as shown in FIGS. 4–6, the depending end 62 of the clip portion 60 preferably contacts a front side 74 of the sun visor 70 to hold the front surface 64 of the rectangular base 20 in flush contact with a rear side 76 of the sun visor 70. Thus, the clip portion 60 is sufficiently resilient to be fit over the edge 66 or 68 of the sun visor 70, yet the bias of the depending end 62 is sufficiently strong to firmly hold the front surface 64 of the base 20 against the rear 76 of the sun visor 70, as best shown in FIG. 6.

To enhance the grip between the base 20 and the sun visor 70, the front surface 64 of the base 20 is preferably textured as shown in FIGS. 1 and 3. The texture preferably comprises a plurality of raised surfaces 78 in the shape of squares or flattened pyramids. Although a waffle pattern texture is shown in FIG. 1, a number of other textures may be utilized by one skilled in the art to increase the frictional contact between the front surface 64 of the base 20 and the rear side 76 of the sun visor 70.

Additionally, while the preferred embodiment of the base 20 includes the rounded clip portion 60 for securing the base 20 to the sun visor 70, one skilled in the art may substitute a number of alternative means for attaching the base 20 to the visor. For example, the front surface 64 of the base 20 could be coated with an adhesive material for fixing the base 20 to the rear side 76 of the sun visor 70. However, while a self-adhering base 20 would not require the clip portion 60 and thus may be easier to install than the preferred embodiment shown in FIGS. 4–6, the semi-permanent nature of the adhesive bond would make it difficult to reposition the base 20 on the sun visor 70 or move the base 20 and extension member 22 to a different sun visor. Alternatively, a Velcro™ strip (not shown) could first be applied to the rear side 76 of the sun visor 70 while a corresponding Velcro™ strip could be attached to the front surface 64 of the base 20 to allow releasable attachment of the base 20 to the sun visor 70. Thus, the present invention is intended to encompass a number of alternative means for attaching the base 20 to the sun visor 70.

FIGS. 4–6 illustrate a preferred use of the sun visor extension of the present invention with the sun visor 70 of an automobile (shown in phantom). FIGS. 4 and 5 depict a view out a front windshield 80 of the automobile where the sun visor 70 has been extended downward to shield the eyes of the vehicle's driver. However, a gap clearly exists between the right side of the visor 70 and a rear view mirror 82 of the vehicle (FIG. 4).

The clip portion 60 preferably fits over the top edge 66 of the sun visor 70 adjacent the right end of the visor 70 to allow the extension member 22 to be selectively moved between a stowed position behind the visor 70 (FIG. 4) and an extended or deployed position to the right of the visor 70 (FIG. 5). In the stowed position shown in FIG. 4, the rounded end 52 provides a convenient handle for the driver to grasp and pull the extension member 22 to the right as shown in FIG. 5. Thus, the rounded ends 50 and 52 allow for easy deployment of the extension member 22, even when the member 22 is completely hidden behind the sun visor 70.

FIG. 6 illustrates the same driver side sun visor 70 pivoted about a vertical axis to shield the vehicle driver from light rays passing through a side window 84. FIG. 6 thus illustrates that the vehicle driver may slide the extension member 22 between the stowed position and the fully deployed position to extend the coverage of the side window 84 provided by the sun visor 70. FIG. 6 also serves to illustrate the position of the base 20 and the extension member 22 in relation to the rear side 76 of the visor 70.

It is to be understood that FIGS. 4–6 illustrate only one possible connection of the preferred base 20 and clip portion 60 to the sun visor 70. A user may opt to fit the clip portion 60 over the bottom edge 68 rather than the top edge 66 of the visor 70. Because the tracks 24 and 26 are preferably identical, the sliding motion of the extension member 22 within the channels 36 and 38 is not altered by placement of the clip portion 60 over the bottom edge 68 of the visor 70. Additionally, a user may opt to secure the base 20 to the front side 74 of the sun visor 70 rather than the rear side 76 as shown in FIGS. 4–6. This could be accomplished with the preferred embodiment by securing the clip portion 60 over either the top or bottom edges (66, 68) of the visor so that the depending end 62 of the clip portion 60 engages the rear side 76 of the visor 70. Alternatively, attachment means such as the Velcro™ strip described above could be secured to the front side 74 of the visor and a matching Velcro™ strip could be secured to the front surface 64 of the base 20 to provide an alternative to the clip portion 60. Thus, a user may choose whether to attach the base 20 to the front side 74 or the rear side 76 of the sun visor 70. In either case, the stowed extension member 22 will be on the opposite side of the visor 70 from the driver when the visor 70 is in one of the two positions shown in FIGS. 4–6 (i.e., adjacent the front windshield 80 or the side window 84). However, the rounded ends 50 and 52 provide a convenient means for grasping the extension member 22 regardless of whether the extension member 22 is hidden as in FIG. 4 or exposed as in FIG. 6.

The base 20, the extension member 22, the tracks 24 and 26, and the clip portion 60 are all preferably formed from plastic using commonly known molding or extruding techniques. Plastic has the benefit of providing sufficient strength to withstand the harsh environment of the vehicle interior while providing sufficient resiliency for the clip portion 60 to act as a spring member in securing the base 20 to the visor 70. However, one skilled in the art may substitute other materials such as wood, metal or fabric for any or all of the components of the present invention.

The extension member 22 is preferably opaque to enhance its function as a sun shield, although a tinted, transparent or translucent plastic may also be used to reduce rather than block sun glare. The base 20 and clip portion 60 may also be opaque to match the extension member 22 or may similarly be formed from a transparent or translucent plastic to allow a user to view any items stored between the depending end 62 of the clip portion 60 and the sun visor 70.

In summary, the sun visor extension of the present invention provides a simple solution to the long-standing problem of inadequately sized sun visors. While not purporting to address problems relating to the vertical dimension of an extended sun visor 70, the base 20 and the extension member 22 can be used to effectively extend the lateral dimension of the visor 70 regardless of whether the visor 70 is extended in front of or to the side of the vehicle occupant. The simple construction of the base 20, the extension member 22, and the tracks 24, 26 provide for an inexpensive extension system that is easy to install and operate. Furthermore, the shape of the channels 36, 38 permits an easy sliding motion between the extension member 22 and the base 20 while simultaneously maintaining a firm grip on the extension member 22, thereby preventing the member 22 from vibrating within the channels 36, 38 or sliding unintentionally (such as when the vehicle turns sharply). Lastly, the clip portion 60 (or other alternative fastening means) allows the base 20 to be easily attached to and removed from the visor 70. The ability to adjust the position of the base 20 on the visor 70 further allows a user to establish the maximum extension of the member 22 relative to the visor. Thus, in the example shown in FIGS. 4 and 5, a user may position the base 20 on the visor 70 so that, even when fully extended, the right side of the extension member 22 does not obstruct the view of the mirror 82.

A number of presently preferred embodiments of the present invention have been described with a degree of particularity. This description of preferred examples of implementing the invention is not necessarily intended to limit the scope of the invention. The scope of the invention is defined by the following claims.

The invention claimed is:

1. A sun visor extension for extending the lateral coverage provided by a vehicle sun visor, said sun visor extension comprising:

a base having fastening means adapted to secure said base to a surface of said sun visor;

a substantially rectangular glare-reducing extension member defining two opposing ends and two edges extending between said opposing ends; and opposing tracks secured to the base, said opposing tracks defining opposing channels for receiving the edges of the extension member and allowing sliding movement of the extension member relative to the base; and wherein:

the opposing ends of the extension member are shaped to prevent the opposing ends from entering the opposing channels.

2. A sun visor extension according to claim 1, wherein said opposing ends are rounded.

3. A sun visor extension according to claim 2, wherein each of said tracks comprises:

a first wall attached to said base;

a second wall attached to said first wall and extending outwardly from said first wall; and a third wall attached to said second wall and extending substantially parallel to said first wall, said third wall biased in a direction toward said first wall.

4. A sun visor extension according to claim 1, wherein said extension member is formed from an opaque material.

5. A sun visor extension according to claim 1, wherein said extension member is formed from a translucent material.

6. A sun visor extension according to claim 1, wherein said fastening means is further adapted to releasably attach said base to said surface of said sun visor.

7. A sun visor extension according to claim 6, wherein said fastening means further comprises a textured surface defined on said base, said textured surface adapted to contact said surface of said sun visor.

8. A sun visor extension according to claim 6, wherein said sun visor includes an upper edge and a lower edge, and said fastening means further comprises:

a clip attached to one end of said base, said clip adapted to fit over one of said upper edge and said lower edge of said sun visor.

9. A sun visor extension according to claim 8, wherein said clip is formed integrally with said base.

10. A sun visor extension according to claim 9, wherein said base and said integral clip are formed from plastic.

* * * * *